US012272094B2

(12) United States Patent
Türkoğlu et al.

(10) Patent No.: US 12,272,094 B2
(45) Date of Patent: Apr. 8, 2025

(54) VISUAL CAMERA RE-LOCALIZATION USING GRAPH NEURAL NETWORKS AND RELATIVE POSE SUPERVISION

(71) Applicant: Niantic, Inc., San Francisco, CA (US)

(72) Inventors: Mehmet Özgür Türkoğlu, Zurich (CH); Aron Monszpart, London (GB); Eric Brachmann, Hanover (DE); Gabriel J. Brostow, London (GB)

(73) Assignee: Niantic, Inc., San Francisco, CA (US)

( * ) Notice: Subject to any disclaimer, the term of this patent is extended or adjusted under 35 U.S.C. 154(b) by 492 days.

(21) Appl. No.: 17/546,375

(22) Filed: Dec. 9, 2021

(65) Prior Publication Data
US 2022/0189060 A1 Jun. 16, 2022

Related U.S. Application Data

(60) Provisional application No. 63/123,474, filed on Dec. 10, 2020.

(51) Int. Cl.
*G06T 7/73* (2017.01)
*G06T 7/11* (2017.01)
(Continued)

(52) U.S. Cl.
CPC ............... *G06T 7/74* (2017.01); *G06T 7/11* (2017.01); *G06T 7/13* (2017.01); *G06V 10/7715* (2022.01)

(58) Field of Classification Search
CPC ..... G06T 7/74; G06T 7/11; G06T 7/13; G06T 2207/20072; G06T 2207/20084;
(Continued)

(56) References Cited

U.S. PATENT DOCUMENTS

2019/0287311 A1 9/2019 Bhatnagar et al.
2020/0309534 A1 10/2020 Chen et al.
(Continued)

FOREIGN PATENT DOCUMENTS

CN 110909685 A 3/2020
CN 111311714 A 6/2020
(Continued)

OTHER PUBLICATIONS

Taiwan Patent Office, Office Action, Taiwanese Patent Application No. 110146173, Sep. 27, 2022, 17 pages.
(Continued)

*Primary Examiner* — Jerome Grant, II
(74) *Attorney, Agent, or Firm* — Fenwick & West LLP (57) ABSTRACT

The present disclosure describes approaches to camera re-localization using a graph neural network (GNN). A re-localization model includes encoding an input image into a feature map. The model retrieves reference images from an image database of a previously scanned environment based on the feature map of the image. The model builds a graph based on the image and the reference images, wherein nodes represent the image and the reference images, and edges are defined between the nodes. The model may iteratively refine the graph through auto-aggressive edge-updating and message passing between nodes. With the graph built, the model predicts a pose of the image based on the edges of the graph. The pose may be a relative pose in relation to the reference images, or an absolute pose.

18 Claims, 7 Drawing Sheets

(51) Int. Cl.
*G06T 7/13* (2017.01)
*G06V 10/77* (2022.01)

(58) Field of Classification Search
CPC ...... G06T 2207/30244; G06V 10/7715; G06V 10/426; G06V 10/82; A63F 13/216; A63F 13/35; A63F 13/655; A63F 13/67
USPC .......................................................... 382/103
See application file for complete search history.

(56) References Cited

U.S. PATENT DOCUMENTS

| | | | |
|---|---|---|---|
| 2020/0311402 A1 | 10/2020 | Zhang et al. | |
| 2020/0334849 A1 | 10/2020 | Schroeder et al. | |
| 2021/0201111 A1* | 7/2021 | Laszlo | G06N 3/086 |
| 2022/0198677 A1* | 6/2022 | Bisain | G06T 7/174 |

FOREIGN PATENT DOCUMENTS

| | | | | |
|---|---|---|---|---|
| CN | 111782838 | * | 10/2020 | ........... G06F 16/532 |
| CN | 111782840 | * | 10/2020 | ....... G06F 16/90332 |
| WO | WO 2020/232174 A1 | | 11/2020 | |

OTHER PUBLICATIONS

Balntas, V. et al. "RelocNet: Continuous Metric Learning Relocalisation Using Neural Nets." European Conference on Computer Vision, Sep. 8-14, 2018, pp. 782-799.

PCT International Search Report and Written Opinion, PCT Application No. PCT/IB2021/061476, Mar. 15, 2022, nine pages.

Rong, Y. et al. "DropEdge: Towards Deep Graph Convolutional Networks on Node Classification." International Conference on Learning Representations, Apr. 26-May 1, 2020, pp. 1-17.

Turkoglu, M. O. et al. "Visual Camera Re-Localization Using Graph Neural Networks and Relative Pose Supervision." 2021 International Conference on 3D Vision (3DV), Dec. 1-3, 2021, pp. 1-15.

Zhou, Y. et al. "Graph Neural Network for Video-Query Based Video Moment Retrieval." arXiv Preprint arXiv:2007.09877v1, Jul. 20, 2020, pp. 1-29.

Taiwan Patent Office, Office Action, Taiwanese Patent Application No. 110146173, May 24, 2023, 10 pages (with concise explanation of relevance).

* cited by examiner

VISUAL CAMERA RE-LOCALIZATION USING GRAPH NEURAL NETWORKS AND RELATIVE POSE SUPERVISION

CROSS REFERENCE TO RELATED APPLICATIONS

This application claim priority to U.S. Provisional Application No. 63/123,474 filed on Dec. 10, 2020, which is also incorporated by reference.

BACKGROUND

1. Technical Field

The subject matter described relates generally to camera localization, and, in particular, to machine-learned model that uses a graph neural network to determine relative pose between images.

2. Problem

Camera re-localization generally refers to a process for determining the location and orientation (pose) of a camera within an environment using images captured by the camera. Camera re-localization has a wide and increasing array of uses. In augmented reality (AR) applications, a virtual environment is co-located with a real-world environment. If the pose of a camera capturing images of the real-world environment (e.g., a video feed) is accurately determined, virtual elements can be overlaid on the depiction of the real-world environment with precision. For example, a virtual hat may be placed on top of a real statue, a virtual character may be depicted partially behind a physical object, and the like.

The camera re-localization task is hard. It is beneficial to use minimal information when building a map or training a representation, and then accurately infer the position and orientation (6-DoF) of a query image at test time. Descriptor-based scene reconstruction and camera calibration works for scenes with easy-to track feature points and large numbers of images if each feature point has enough observations from different-enough viewpoints. However, they fail in fairly common situations, such as with texture-less scenes and places with foliage or bricks, where the detectors and descriptors are distributed unevenly and with potentially many false matches.

SUMMARY

The present disclosure describes approaches to camera re-localization that use a graph neural network (GNN) to determine the relative pose between a current image and other images of a physical environment. For a previously-scanned location, a single test-image can contain enough information to infer the query camera's x6-DoF pose. In contrast to known best-performing methods that use models trained to determine absolute pose (e.g., the GPS coordinates and orientation expressed as a bearing), the disclosed approach uses a model that is trained from relative poses of training scenes. For inference, a graph is built connecting the query image to training counterparts. The resulting GNN has image representations on nodes and image-pair representations on edges. Messages may be passed between the nodes, enabling refinement of both representation types to produce a consistent camera pose estimate.

In one or more embodiments, a computer-implemented method is disclosed. The method comprises: receiving an image of a scene captured by a camera of a client device; inputting the image of the scene into a re-localization model, wherein the re-localization model performs steps comprising: encoding the image into a feature map; retrieving reference images from an image database based on the feature map of the image; building a graph based on the image and the reference images comprising: nodes representing the image and the reference images, and edges between the nodes; and predicting a pose of the image based on the graph; receiving, from the re-localization model, the predicted pose for the image of the scene; and generating, using the predicted pose, virtual content for display by the client device in conjunction with the scene. In other embodiments, a system configured to perform the method is disclosed; and/or a non-transitory computer-readable storage medium storing instructions for performing the method is disclosed.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
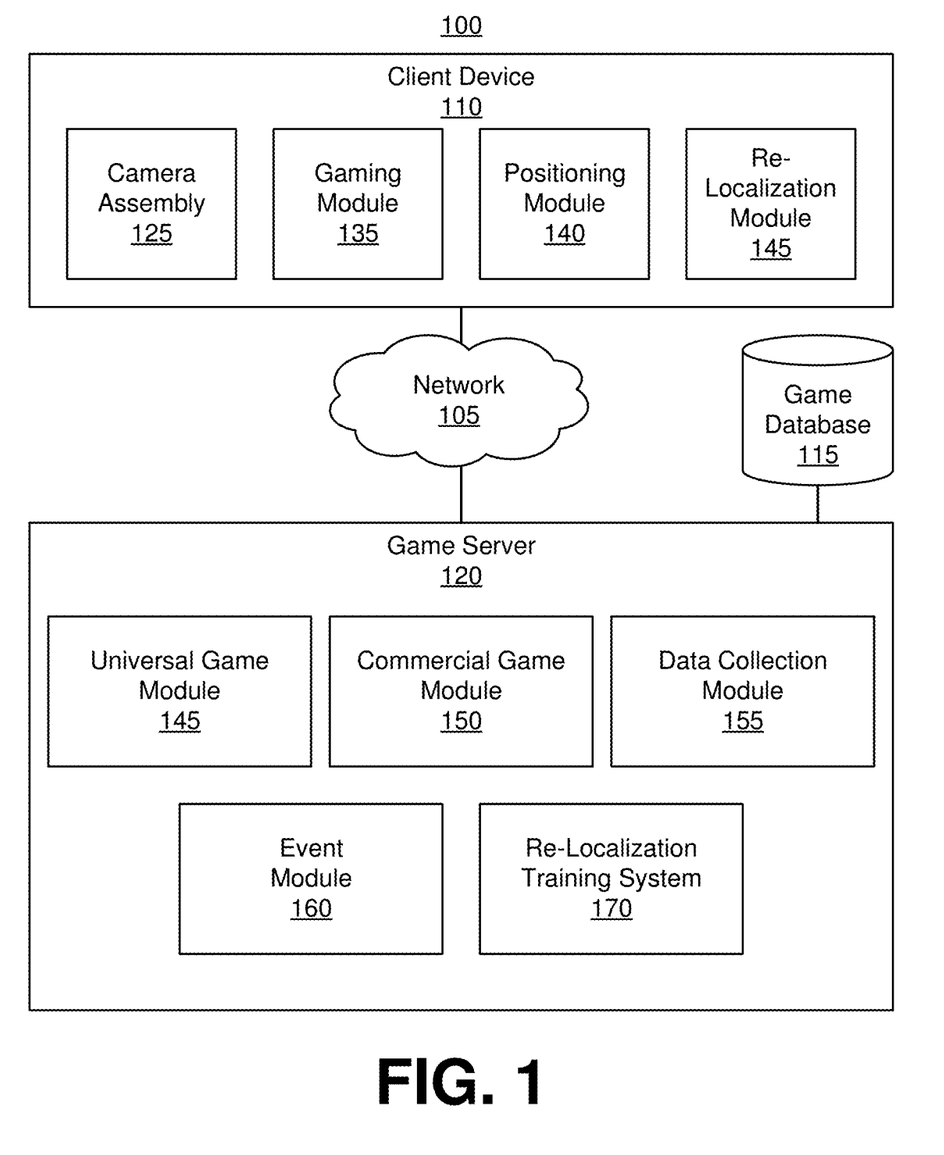
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

Figure 2:
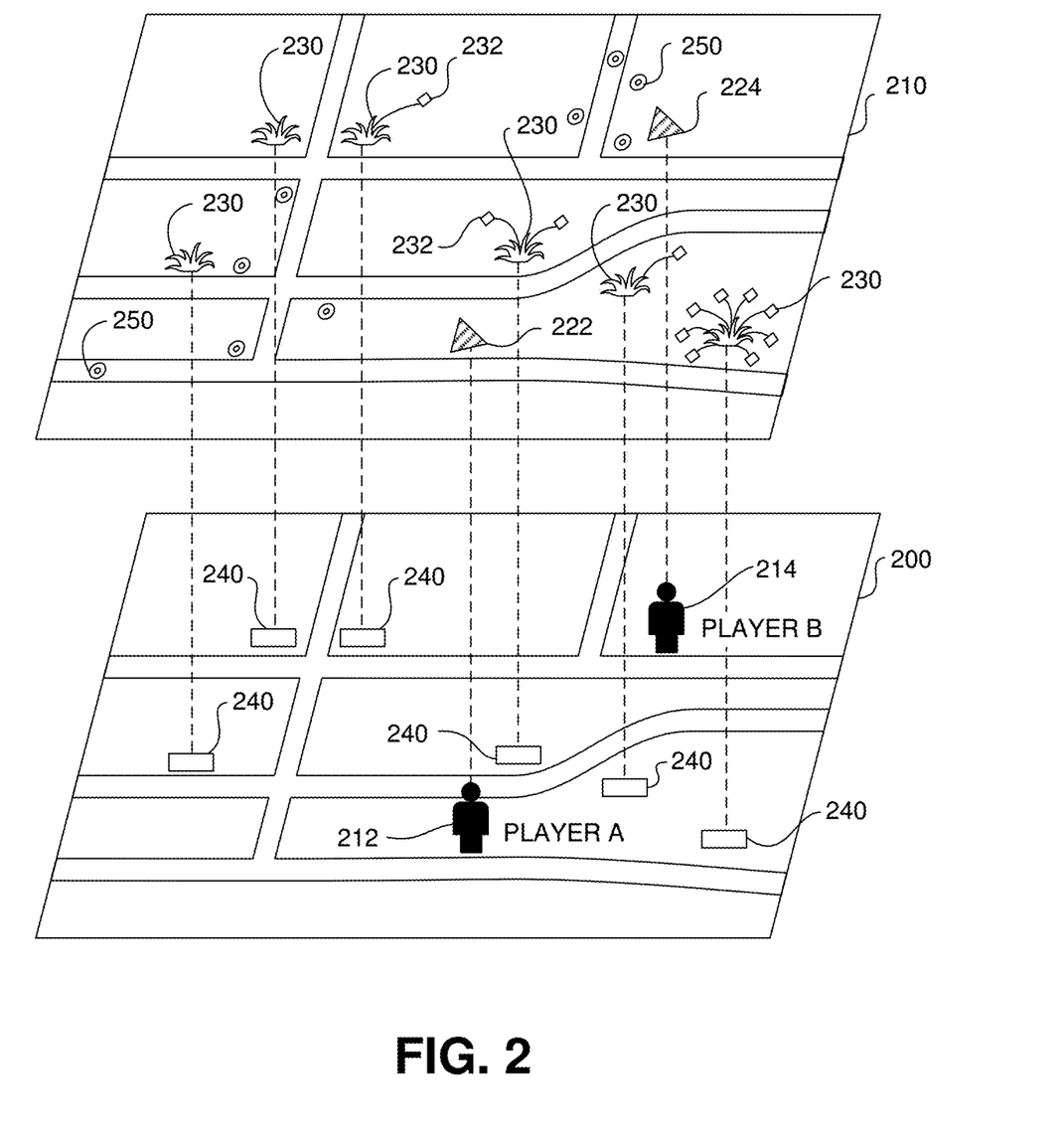
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is in. In the embodiment shown in FIG. 1, each client device 110 includes software components such as a gaming module 135 and a positioning module 140. The client device 110 also includes a re-localization module 145. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information. In another example, the gaming module 135 may update a virtual element based on a pose of the camera assembly, e.g., as determined by the re-localization module 145.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The re-localization module 145 uses a trained re-localization model to determine the pose of one or more cameras of the camera assembly 125. The re-localization model is trained to determine the relative pose of a camera from one or more images captured by that camera relative to one or more existing images of the physical environment around the client device 110. In one embodiment, the re-localization module 145 may convert the relative pose into an absolute pose with reference to known absolute poses of one or more of the existing images. For example, the game database 115 may store a set of reference images of the physical environment captured by cameras with different poses. The absolute pose for each reference image may be stored in association with the reference images (e.g., as metadata). Thus, once the pose of the camera of the client device 110 has been determined relative to one or more of the reference images, the absolute pose of the camera of the client device may be determined using the absolute pose of the reference images and the relative pose of the camera. An embodiment of a re-localization model is discussed below (in reference to FIG. 4) during the training of the re-localization model by the re-localization training system 170 of the game server 120.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a re-localization training system 170. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The re-localization training system 170 trains a re-localization model, e.g., the model used by the re-localization module 145 of the client device 110 to determine a pose of one or more cameras of the camera assembly 125. The re-localization training system 170 receives image data for use in training the re-localization model. Generally, the re-localization training system 170 inputs an image into the re-localization model to generate relative pose predictions between the input image and other images captured in the same physical environment represented in a GNN, calculates a loss from the predicted relative pose and the ground truth relative pose, and updates the mode iteratively to minimize a total loss. The general process above describes an end-to-end supervised training algorithm. The re-localization training system 170 may define a total loss threshold for the re-localization model which can be used to determine whether the re-localization model is sufficiently accurate in estimating relative poses.

Once the re-localization model is trained, the re-localization model receives image data and outputs an estimated relative pose for the camera that captured the image data relative to other images depicting portions of the same physical environment. The relative pose may be converted to an absolute pose if one of more of the other images has a known absolute pose. The re-localization training system 170 provides the trained model to the client device 110. The client device 110 uses the trained model to estimate the pose for images (e.g., captured by a camera on the device). The estimated poses may be used for re-localization of the client device 110.

Figure 4:
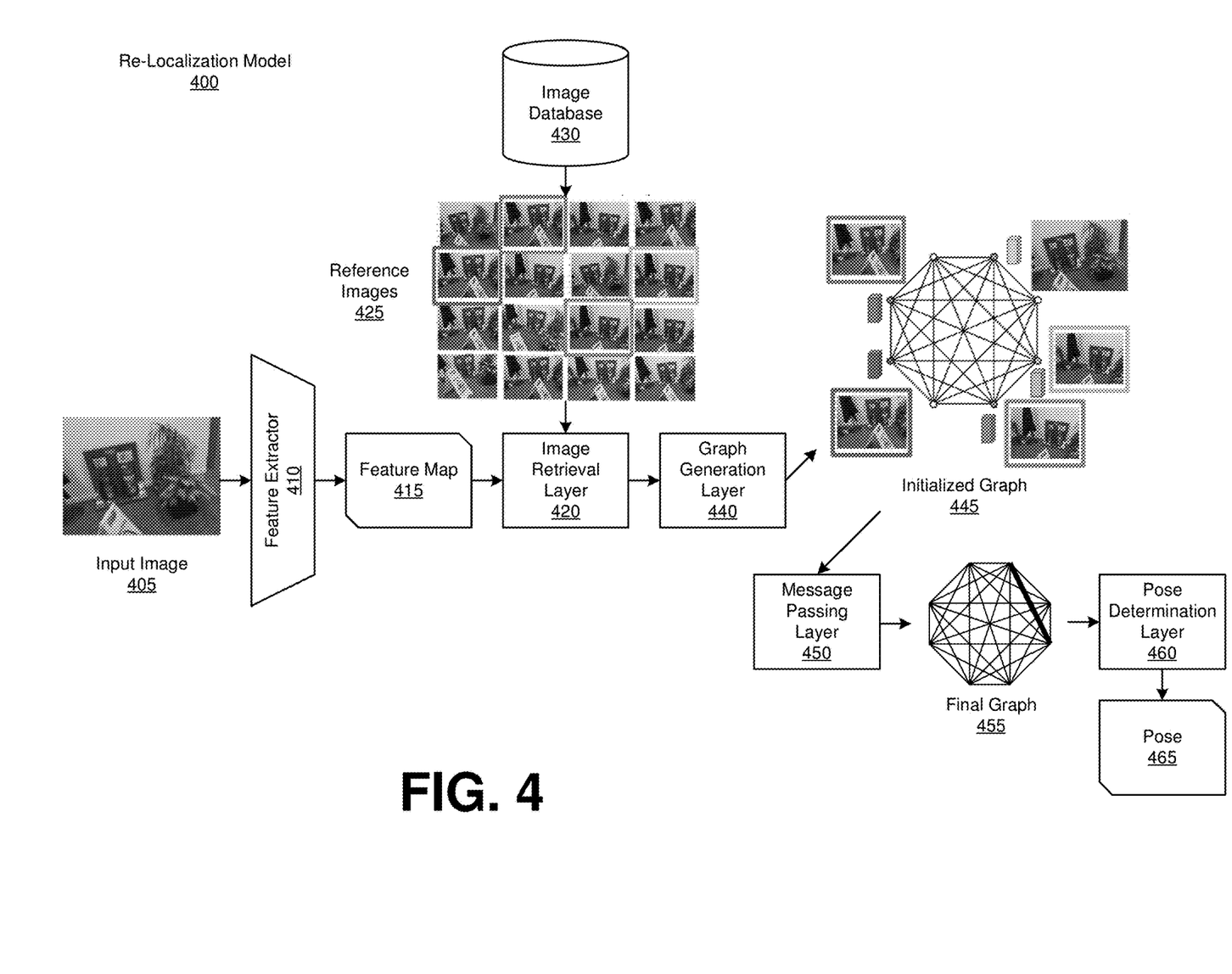
FIG. 4 illustrates an example architecture of a re-localization model, in accordance with one or more embodiments.

FIG. 4 illustrates an example architecture of a re-localization model 400, in accordance with one or more embodiments. The re-localization model 400 comprises, among potentially other components, a feature extractor 410, an image retrieval layer 420, an image database 430, a graph generation layer 440, a message passing layer 450, and a pose determination layer 460. In other embodiments, the re-localization model 400 includes additional components. Although the components are described below in reference to an input image 405 during inference or deployment (e.g., by the re-localization module 145), training generally involves a similar flow of training images through the re-localization module 400. Generally, the re-localization model 400 may be trained by one or more machine learning algorithms. In one or more embodiments, the re-localization model 400 (e.g., the various components) may be trained through supervised learning where training images with known poses are passed through the re-localization model to accurately predict the known pose by training parameters of the re-localization model 400. As discussed above, training of the re-localization model 400 may be performed by the re-localization training system 170 of the game server 120.

The feature extractor 410 extracts feature map 415 from an input image 405. The input image 405 may be captured by the camera assembly 125. The feature extractor 410 extracts the feature map 415 with one or more feature extraction algorithms, which may include: image convolution, pattern recognition, object recognition, edge detection, semantic segmentation, other algorithms capable of extracting features of an image, etc.

The image retrieval layer 420 retrieves reference images 425 from the image database 430 based on the feature map 415. The image retrieval layer 420 may also extract a feature map for each of the images stored in the image database 430. The image database 430 may include a plurality of reference images captured by a camera assembly (e.g., the camera assembly 125 of the client device 110, or another camera assembly). The reference images may be parsed from a video data stream captured by the camera assembly, e.g., each frame of the video becoming a reference image. One or more of the reference images may be associated with a ground truth pose. For example, a position sensor (e.g., an accelerometer, a gyroscope, some other sensor capable of determining orientation and/or translation) may be used in conjunction with the camera assembly to determine the ground truth pose of the one or more reference images.

The image retrieval layer 420 retrieves a set number of reference images 425 for building a GNN. This number may be set as a parameter or adjusted during training. In one embodiment, the image retrieval layer 420 identifies a most similar image in the image database 430 to the input image 405. The most similar image may have a feature map that is the closest match to the feature map 415 of the input image 405, i.e., the feature map of most similar image has the smallest distance from the feature map 415 of the input image 405. The image retrieval layer 420 identifies the nearest neighbors to the most similar image in the feature space. Nearest neighbors may have feature maps that are closest in proximity to the feature map of the most similar image. The image retrieval layer 420 selects from the nearest neighbors until the set number of references images 425 is selected. In some embodiments, the image retrieval layer 420 samples from the nearest neighbors (e.g., by selecting every k-th image, randomly selected k) until the set number of reference images 425 are selected. In one or more embodiments, the most similar image is defined as the anchor image with the subsequently selected images defined as the nearest neighbor images. In other embodiments, the images may be ranked according to proximity to the input image 405, resulting in an ordered ranking from $1^{st}$ most similar, $2^{nd}$ most similar, and so on to the kth most similar.

The graph generation layer 440 builds a graph (as part of a GNN) based on the reference images 425. The graph generation layer 440 initializes nodes of the initialized graph 445 based on the reference images 425 and the input image 405. Each node may be represented as a node feature vector, e.g., as features of the feature map extracted by the feature extractor 410. In some embodiments, the node feature vector representing the nodes may be generated by a sublayer of the graph generation layer 440. An edge is located between two nodes and represented by an edge feature vector, and may be initialized by concatenating features of their nodes and projecting them with a learned linear mapping into an edge feature vector.

Once the initialized graph 445 is initialized, the message passing layer 450 may refine the graph through message passing. Edges may be updated in an auto-regressive manner, using the nodes of the edges. For example, a 2-layer MLP (multilayer perceptron) with ReLU activations. For example, the function $f_{edge}$ is an auto-regressive function that updates edges.

$$e_{ij} := f_{edge}([e_{ij}, x_i, x_j])$$

Wherein $e_{ij}$ represents an edge feature vector between nodes i and j, with $x_i$ and $x_j$ representing the node feature vectors of node i and j, respectively. After a round of updating the edges, messages are generated for each node from its connected neighboring nodes (e.g., by an edge). The message is based on the neighboring node and the edge.

$$m(v_j \to v_i) = m_{ji} = f_{msg}([e_{ij}, x_j])$$

Wherein $m(v_j \to v_i)$ or $m_{ji}$ is the message from node j to node i, calculated as a function of $f_{msg}$ based on edge feature vector ed; between nodes i and j and node j's feature vector $x_j$. A self-attention mechanism may be implemented, which may interpret a message as an unordered sequence of 1-dimensional features, and may compute the response at a given node as a weighted sum over all elements in the unordered sequence. The message may also be compressed to a lower dimension through a learned mapping, multiplied with an attention map, and upsampled back to original size with another learned mapping. A node is updated by aggregating all messages received from neighboring nodes.

$$x_i := f_{upd}([x_i, m_i^{agg}]),$$

Wherein the updated node $x_i$ is calculated by the function $f_{upd}$ operating on the original $x_i$ and the aggregate message $m_i^{agg}$. Aggregation algorithms may include mean aggregation, max aggregation, sum aggregation, another manner of aggregating messages, etc. Edge dropout may also be implemented, during training, which removes one or more edges (e.g., randomly, or by some threshold criteria) to reinforce the learning of the message passing layer 450 during graph refinement. Multiple iterations of refining the graph may proceed. For example, the message passing layer 450 refines the graph in two iterations of message passing. The result is a final graph 455.

The pose determination layer 460 determines a pose 465 of the input image 405 based on the final graph 455. In one or more embodiments, the pose determination layer 460 may output a pose 465 (e.g., in 6 degrees of freedom) based on one or more edges of the final graph 455. In one or more embodiments, the pose determination layer 460 regresses the edge features in the final graph 455 to translation and orientation with a linear projection.

$$\hat{p}_{ij} = [\hat{t}_{ij}, \log(\hat{q})_{ij}] = W_{pose} e_{ij} + b.$$

Wherein predicted pose $\hat{p}_{ij}$ comprises translation component $\hat{t}_{ij}$ and orientation component $\log(\hat{q})_{ij}$ (represented in log quarternions) based on a linear projection $W_{pose}$ of the edge feature vector $e_{ij}$ with an intercept b. To train the pose determination layer 460, a loss function calculates a loss between the predicted pose and the ground truth pose of an image pair in the graph. In one or more embodiments, the loss function is defined as:

$$L = \frac{1}{N_e} \sum_{v_{ij} \in E} d(\hat{p}_{ij}, p_{ij}).$$

Wherein L is the loss function, $N_e$ is the number of edges, $v_{ij}$ represents each edge of the graph. And $d(\ )$ is the distance function between the predicted relative pose $\hat{p}_{ij}$ and the ground truth relative pose $p_{ij}$ between the nodes. In one or more embodiments, the distance functions is:

$$d(\hat{p}_{ij}, p_{ij}) = |\hat{t}_{ij} - t_{ij}| e^{-\beta} + \beta + \|\log(\hat{q}_{ij}) - \log(q_{ij})\| e^{-\gamma} + \gamma,$$

Wherein β and γ are weights that balance the translation loss and the orientation loss, respectively. Both β and γ are learned during training. The pose 465 may be determined by a weighted average of predicted poses derived from the edges of the final graph 455. A weighted average inversely proportional to the distance may look like [max feature distance–kth most similar feature distance] divided by the [max feature distance] for each kth most similar image. For example, a $1^{st}$ most similar image has a distance of 1 away from the input image 405, and the $2^{nd}$ most similar image has a distance of 3 away from the input image 405. The weighted average would take into account the max feature distance summing the two distances (3+1=4), and then taking the inverse for each, resulting in (4−1)/4 or 0.75 for the $1^{st}$ most similar image and (4−3)/4 or 0.25 for the $2^{nd}$ most similar image. The pose 465 would be a sum of 0.75*predicted pose from the $1^{st}$ most similar image (and its corresponding edge) and 0.25*predicted pose from the $2^{nd}$ most similar image (and its corresponding edge).

The pose 465 may be a relative pose, i.e., defined as a translation and orientation shift from another image of the graph, or may be an absolute pose as determined based on known poses of the images of the image database 430.

Referring back to FIG. 1, the network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
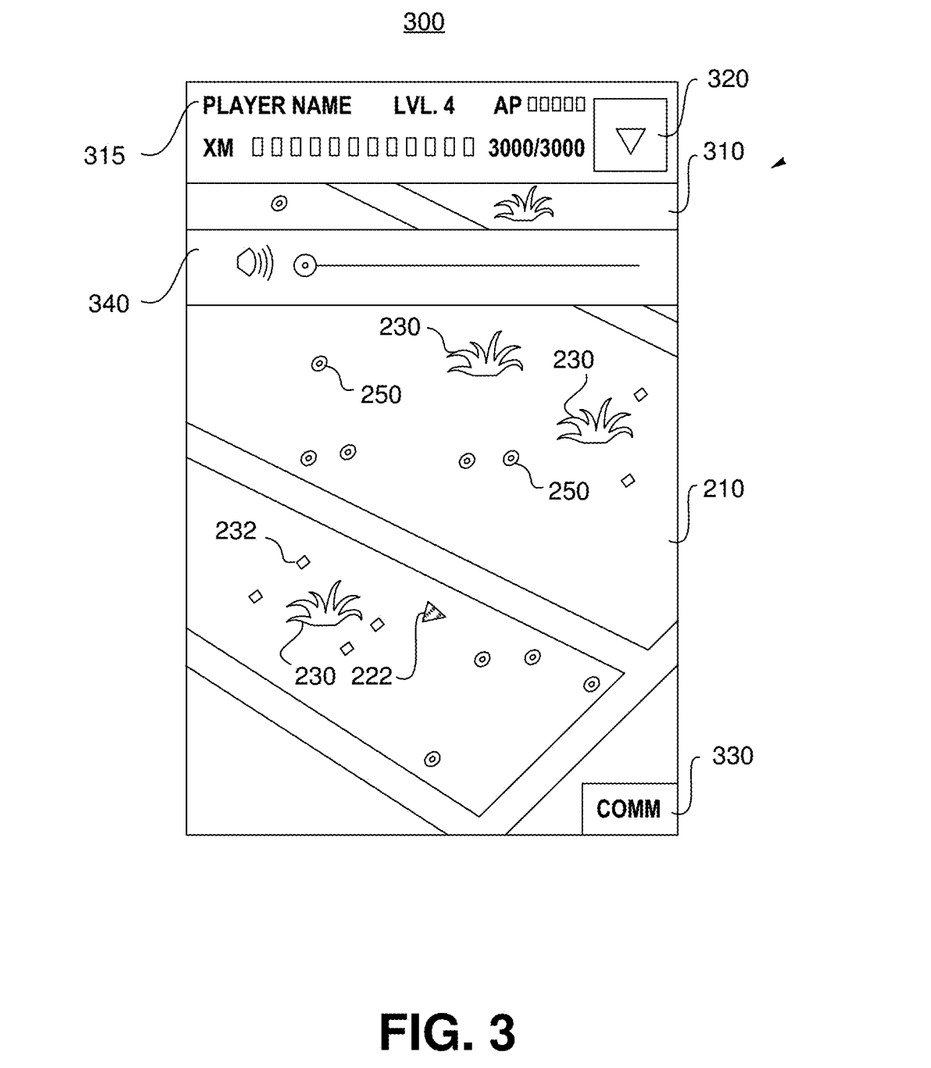
FIG. 3 depicts an exemplary game interface of a parallel reality game, in accordance with one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Example Methods

Figure 5:
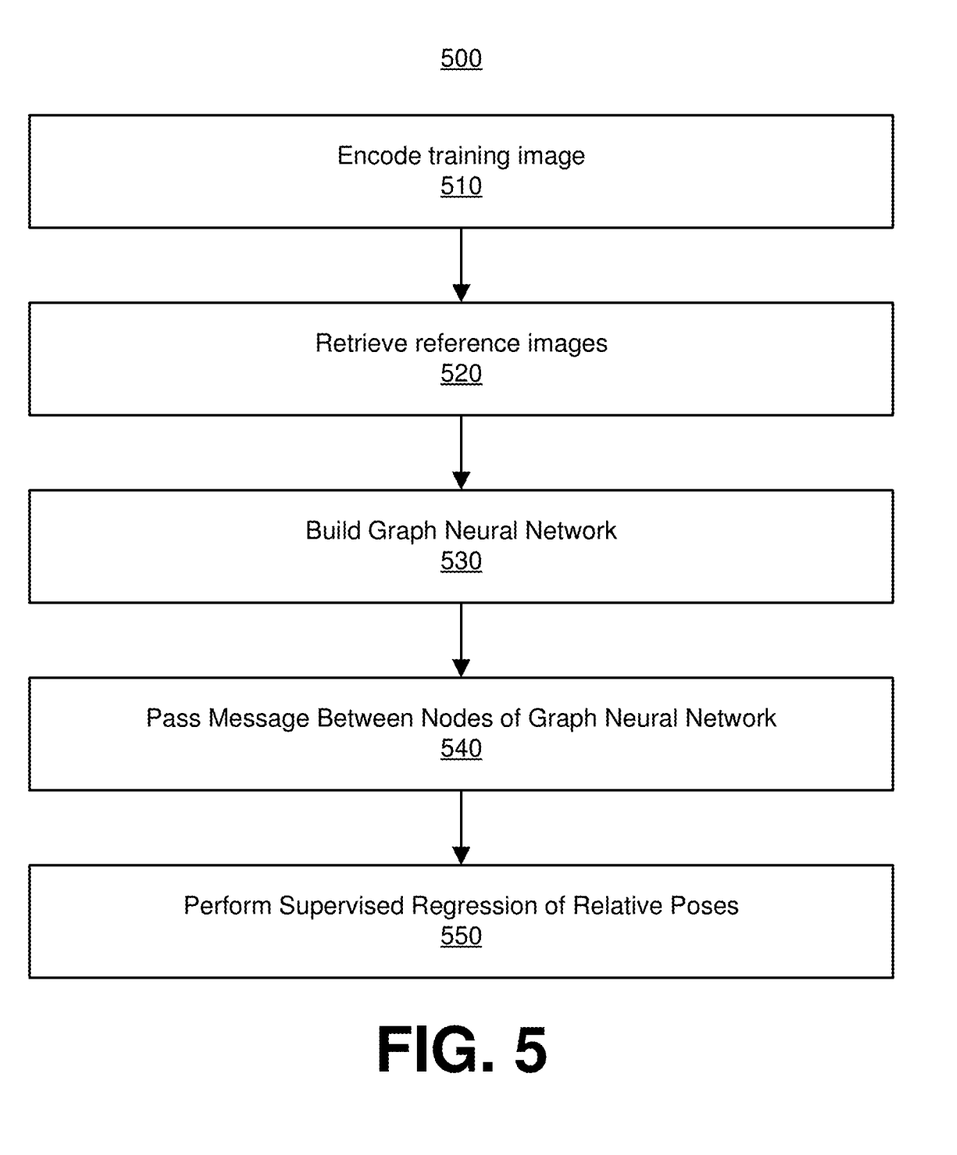
FIG. 5 is a flowchart describing a general process of training a camera pose determination model, in accordance with one or more embodiments.

FIG. 5 is a flowchart describing one iteration of a method 500 of training the re-localization model with reference images, in accordance with one or more embodiments. At training time, the method 500 will typically be repeated numerous times with different input images until one or more training targets are met. The method 500 yields a trained re-localization model that can determine the pose of a camera that captured an input image. The steps of FIG. 5 are illustrated from the perspective of the re-localization training system 170 performing the method 500. However, some or all of the steps may be performed by other entities and/or components. In addition, some embodiments may perform the steps in parallel, perform the steps in different orders, or perform different steps.

In the embodiment shown, the method 500 begins with the re-localization training system 170 encoding 510 a training image (e.g., a single RGB image captured by a camera of a client device 110). The training image may be encoded using a convolutional neural network (e.g., ResNet34) to generate a feature map comprising a one-dimensional vector from the input image.

The re-localization training system 170 retrieves 520 reference images. In one embodiment, the reference images are selected from a set of stored images captured from locations within the geographic vicinity of the camera that captured the input image. For example, the set of images can be obtained by querying a database for images tagged with a geographic location (e.g., GPS coordinates) within a threshold distance of the location of the camera (e.g., as determined by the positioning module 140 of the client device 110 with which the input image was captured. A similarity between each image in the set and the input image may be calculated. The reference images may be selected by further filtering the set of images based on the similarities, random selection, or both. For example, the re-localization training system 170 may select the ten most similar images, randomly select ten images from the one hundred most similar images, the first, fourth, seventh, tenth, etc., most similar images, or the like.

The re-localization training system 170 builds 530 a GNN from the reference images. The GNN includes a node for each reference image and edges connecting each possible pair of reference images. The re-localization training system 170 passes 540 messages between the nodes of the GNN. Exactly what information is passed between nodes may be determined automatically using a non-local attention scheme. For example, some image pairs might share a salient geometric object that is well-suited for pose estimation, whereas in another image pair, one of the two views might see a moving object or a cast shadow that should be ignored. The messages received at a given node may be aggregated by taking the mean of the messages received from each of the other nodes.

The re-localization system 170 performs 550 a supervised regression using the GNN to determine an estimated pose of the input image relative to the reference images. A los function is used to enable the re-localization system 170 to train the re-localization model by updating one or more parameters of the model based on the loss function.

Figure 6:
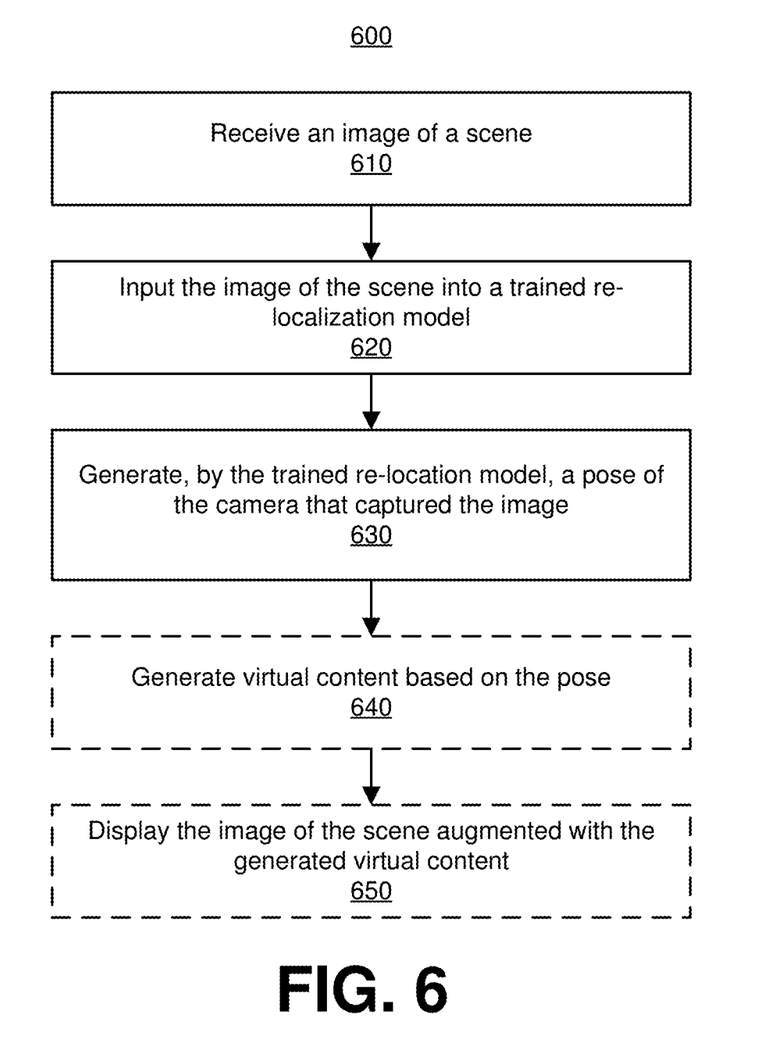
FIG. 6 is a flowchart describing an example use of a depth estimation model trained using depth hints in an augmented reality application, according to one or more embodiments.

FIG. 6 is a flowchart describing a method 600 of using a re-localization model, in accordance with one or more embodiments. The method 600 results in an estimated pose for an input image. The steps of FIG. 6 are illustrated from the perspective of a client device 110 performing the method 600. However, some or all of the steps may be performed by other entities and/or components. In addition, some embodiments may perform the steps in parallel, perform the steps in different orders, or perform different steps.

The client device 110 receives 610 an image of a scene. The image of the scene may be captured by a camera that is a component of the client device 110 or external to the client device 110. In the context of the parallel reality game, the scene may be of real-world locations that may map to virtual locations in the virtual world. The image of the scene may also have intrinsics corresponding to the geometric properties of the camera that captured the image. The image may be a single image captured by the camera. Alternatively, the image may be a frame from video being captured by the camera.

The client device 110 inputs 620 the image of the scene into a trained re-localization model. The re-localization model may be trained by the re-localization training system 170, e.g., via the process 500 of FIG. 5. The re-localization model receives the image of the scene, and, in some embodiments, the intrinsics of the image as well. The re-localization model generates 630 an estimated pose for the camera from the image of the scene. As described previously, the estimated pose may be relative to the poses of one or more other images that depict at least a portion of the same scene. In one embodiment, the client device 110 determines the absolute pose of the input image using the generated relative pose and a known absolute pose of one or more of the other images.

The client device 110 may perform various additional operations with the generated pose. In one embodiment, the client device 110 generates 640 virtual content for a parallel reality game and displays 650 the image of the scene augmented with the virtual content. A display of the client device 110 can provide a constant feed of video captured by the camera with augmented virtual content. For example, a physical object may be augmented with virtual content that interacts with the physical object.

Example Computing System

Figure 7:
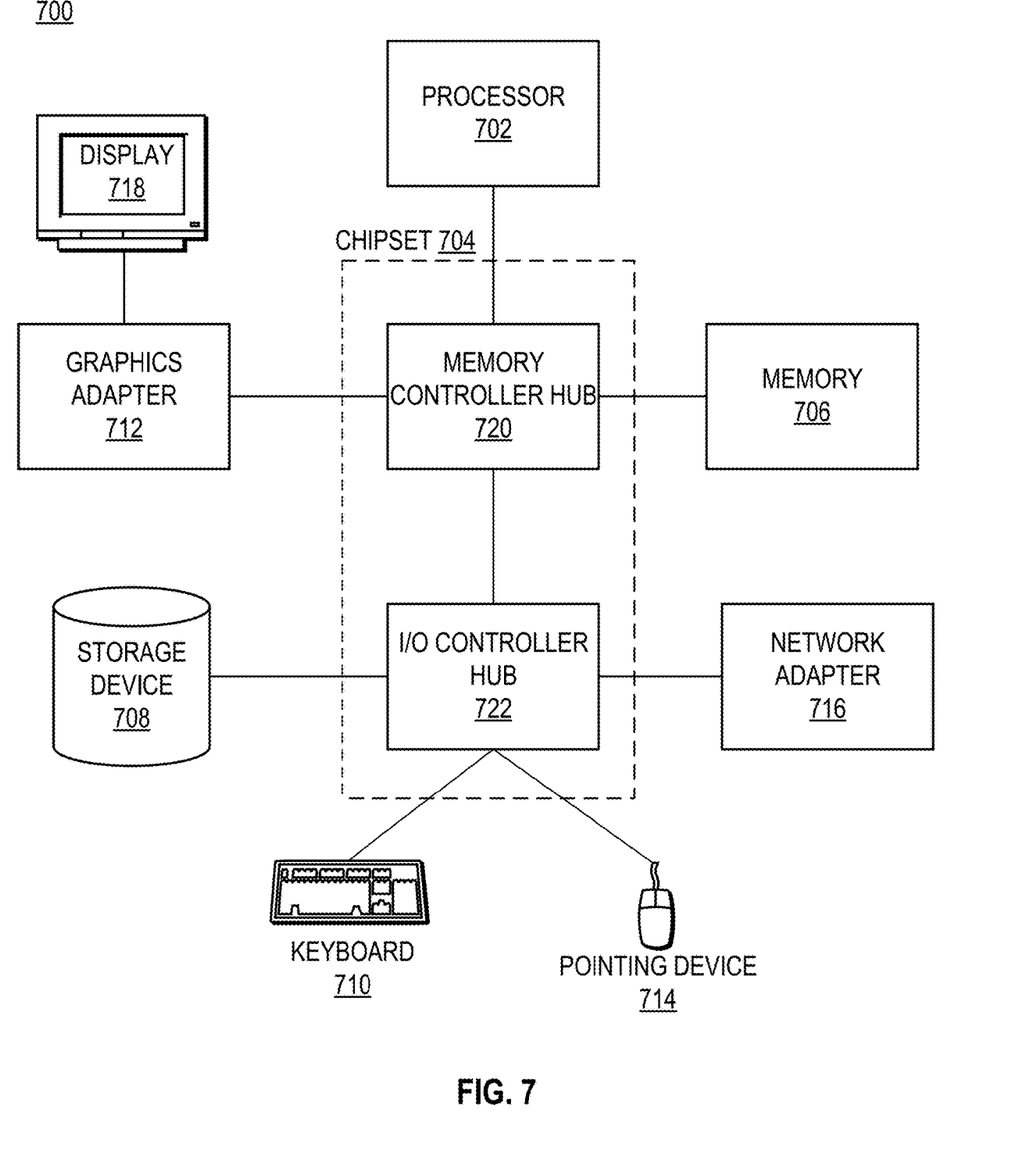
FIG. 7 illustrates an example computer system suitable for use in training or applying a depth estimation model, according to one or more embodiments.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random-access memory, such as DRAM, SRAM, DDR RAM, ROM, EEPROM, flash memory.

As is known in the art, a computer 700 can have different and/or other components than those shown in FIG. 13. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for performing re-localization using a GNN. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method for generating virtual content for display by a client device, the method comprising:
   receiving an image of a scene captured by a camera of the client device;
   inputting the image of the scene into a re-localization model, wherein the re-localization model performs steps comprising:
      encoding the image into a feature map;
      retrieving reference images from an image database based on the feature map of the image;
      building a graph based on the image and the reference images comprising:
         feature vector nodes generated from the feature map that represent the image and the reference images, and
         edges between the feature vector nodes; and
      predicting a pose of the image based on the graph;
   receiving, from the re-localization model, the predicted pose for the image of the scene; and
   generating, using the predicted pose, virtual content for display by the client device in conjunction with the scene.

2. The method of claim 1, wherein encoding the image into a feature map comprises one or more of:
   image convolution;
   pattern recognition;
   object recognition;
   edge detection; and
   semantic segmentation.

3. The method of claim 1, wherein the feature map is a one-dimensional vector of features.

4. The method of claim 1, wherein retrieving the reference images comprises:
   identifying a most similar reference image having a second feature map that is most similar to the feature map of the image; and
   identifying additional reference images having feature maps in proximity to the feature map of the most similar reference image.

5. The method of claim 1, wherein building the graph comprises:
   initializing the reference images and the image of the scene as nodes of the graph; and
   initializing edges between the nodes of the graph.

6. The method of claim 5, wherein initializing the reference images and the image of the scene as nodes comprises encoding the image and the reference images into node feature vectors.

7. The method of claim 6, wherein initializing the edges comprises, for each edge between two nodes:
   concatenating the node feature vectors of the two nodes; and
   projecting the concatenated node feature vectors into an edge feature vector.

8. The method of claim 7, wherein building the graph comprises updating edge feature vectors in an auto-regressive manner.

9. The method of claim 1, wherein the pose comprises a relative pose in relation to the reference images.

10. The method of claim 9, wherein the pose further comprises an absolute pose based on the relative pose and a ground truth pose of one of the reference images.

11. A non-transitory computer-readable storage medium storing instructions that, when executed by a computer processor of a client device, cause the computer processor to perform operations comprising:
   receiving an image of a scene captured by a camera of the client device;
   inputting the image of the scene into a re-localization model, wherein the re-localization model performs steps comprising:
      encoding the image into a feature map;
      retrieving reference images from an image database based on the feature map of the image;
      building a graph based on the image and the reference images comprising:
         feature vector nodes generated from the feature map that represent the image and the reference images, and
         edges between the feature vector nodes; and
      predicting a pose of the image based on the graph;
   receiving, from the re-localization model, the predicted pose for the image of the scene; and
   generating, using the predicted pose, virtual content for display by the client device in conjunction with the scene.

12. The non-transitory computer-readable storage medium of claim 11, wherein the feature map is a one-dimensional vector of features.

13. The non-transitory computer-readable storage medium of claim 11, wherein retrieving the reference images comprises:
   identifying a most similar reference image having a second feature map that is most similar to the feature map of the image; and
   identifying additional reference images having feature maps in proximity to the feature map of the most similar reference image.

14. The non-transitory computer-readable storage medium of claim 11, wherein building the graph comprises:
   initializing nodes of the graph by encoding the image and the reference images into node feature vectors; and
   initializing edges between the nodes of the graph by:
      concatenating the node feature vectors of the two nodes, and
      projecting the concatenated feature vectors into an edge feature vector.

15. The non-transitory computer-readable storage medium of claim 14, wherein building the graph comprises:
   updating edge feature vectors in an auto-regressive manner;
   for each edge, generating a first message from a first node to a second node based on the node feature vector of the first node and the edge feature vector and a second message from the second node to the first node based on the node feature vector of the second node and the edge feature vector; and
   for each node, aggregating messages directed to the node from other nodes of the graph.

16. The non-transitory computer-readable storage medium of claim 11, wherein predicting the pose of the image based on the graph comprises inputting the edges into a regression layer of the re-localization model to output the pose.

17. The non-transitory computer-readable storage medium of claim 11, wherein the pose comprises a relative pose in relation to the reference images.

18. The non-transitory computer-readable storage medium of claim 17, wherein the pose further comprises an absolute pose based on the relative pose and a ground truth pose of one of the reference images.

* * * * *